Dec. 22, 1931.   U. A. WHITAKER   1,837,386
VALVE DEVICE FOR AUTOMATIC TRAIN PIPE COUPLINGS
Filed Dec. 14, 1928
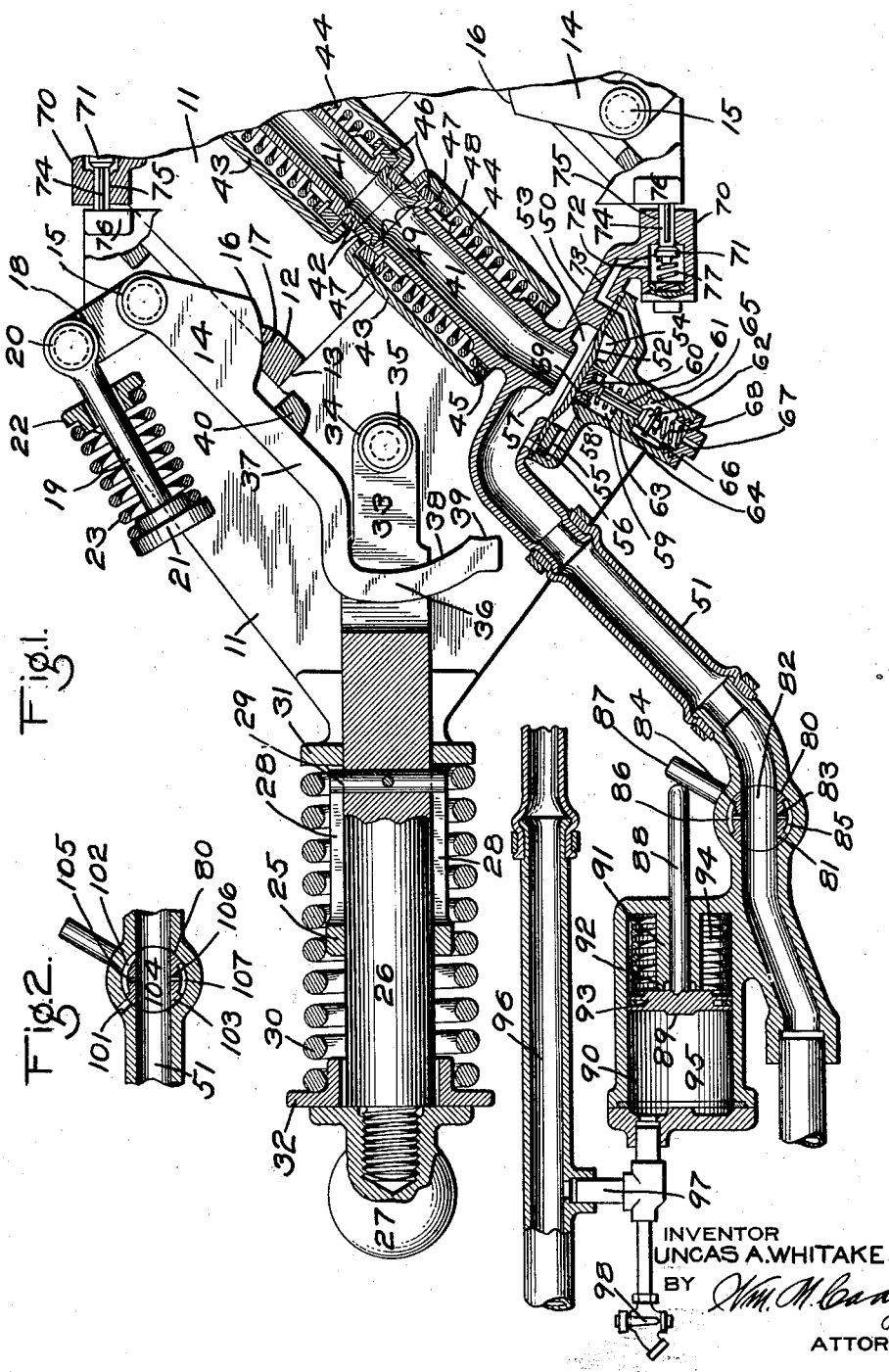
INVENTOR
UNCAS A. WHITAKER
BY
Wm. M. Cady
ATTORNEY Patented Dec. 22, 1931

1,837,386

UNITED STATES PATENT OFFICE

UNCAS A. WHITAKER, OF WILMERDING, PENNSYLVANIA, ASSIGNOR TO THE WESTINGHOUSE AIR BRAKE COMPANY, OF WILMERDING, PENNSYLVANIA, A CORPORATION OF PENNSYLVANIA

VALVE DEVICE FOR AUTOMATIC TRAIN PIPE COUPLINGS

Application filed December 14, 1928. Serial No. 326,088.

This invention relates to automatic train pipe couplings, and more particularly to the type known as the tight or rigid lock coupling.

An object of the invention is to provide a train pipe coupling of the above mentioned type with means for controlling the flow of the fluid through the brake pipe so as to permit at least a service reduction when the couplings are connected regardless of the position of the handle of the brake pipe angle cock.

Another object of the invention is to provide a train pipe coupling of the above mentioned type with means by which the charging of an empty section of train from a charged section will be effected without causing an emergency application on the charged section.

Another object of the invention is to provide a train pipe coupling in which the brake pipe fluid is controlled by means of an automatically operated primary valve device, and a semi-automatically operated secondary valve device which is adapted to regulate the amount of fluid flowing through the brake pipe irrespective of the position of the primary valve device.

Another object of the invention is to provide a train pipe coupling of the character mentioned which is simple in construction, and reliable and exact in function under all conditions of service.

The invention also comprises certain new and useful improvements in the construction, arrangement and combination of the several parts of which it is composed, as will be hereinafter more fully described and claimed.

In the accompanying drawings; Figure 1 is a longitudinal section of an automatic train pipe coupling embodying the invention, showing the same coupled to a counterpart coupling; and Fig. 2 is a section through a portion of the brake pipe, showing a modified form of angle cock installed therein.

Train pipe couplings of the type known as the tight or rigid lock coupling, are shown for example in the Westinghouse Patent No. 708,747, dated September 9, 1902, and in which each coupling head is provided with a laterally projecting hook-shaped portion adapted to engage the corresponding portion of a counterpart coupling by a relatively lateral movement, and be rigidly locked together by cam levers or latches, one pivoted on each coupling head and bearing against the other counterpart coupling head. Train pipe passages are in the coupling heads and are provided with gaskets adapted to abut against corresponding gaskets of the counterpart coupling head when the two are connected together.

While a coupling of the above type will automatically couple with a counterpart coupling when two cars are brought together, it is necessary to manually operate the train pipe valves to charge an empty section of train from a charged section.

By the present invention, means are provided for automatically opening the brake pipe angle cock when the coupling is being coupled to a counterpart coupling in such a manner that when an empty section is being connected to a charged section the amount of fluid under pressure passing from the charged section into the uncharged section will be at such a rate as not to cause an emergency application of the brakes on the charged section. Furthermore, the brake pipe angle cock is so constructed that a service reduction can be made in the brake pipe fluid pressure when the couplings are connected together, regardless of the position of the angle cock handle.

Referring to the drawings, the automatic train pipe coupling head 11 comprises a projecting nose 12 adapted to engage in a recess 13 of a counterpart coupling head.

A lever 14, pivoted in the coupling head 11 at 15, has a cam face 16 adapted to engage the face 17 of a counterpart coupling head and lock the two coupling heads together when the same are coupled in the manner shown in Fig. 1.

The lever 14 carries an arm 18, to which a rod 19 is pivotally connected by a pin 20. The outer end of the rod 19 is provided with a head 21, and interposed between said head and a fixed abutment 22, is a coil spring 23.

The rear end of the coupling head 11 is formed with a tubular extension 25 which constitutes a guide for the forward end of a stem 26.

The stem 26 has its rear end provided with a ball section 27 adapted to be mounted in a socket (not shown) carried by the car.

The tubular extension 25 is provided with diametrically disposed longitudinal slots 28 into which extend the projecting ends of a pin 29 which is passed transversely through the stem 26.

A coil spring 30 encircles the stem 26 and the tubular extension 25, one end of the spring bearing against a flange 31 formed on the inner end of the coupling head, while the opposite end of the spring bears against a collar 32 at the inner end of the stem.

The spring 30 is normally under initial compression, which tends to hold the parts extended. However, when the coupling head is coupled to a counterpart coupling, the spring is compressed, and the forward end of the stem 26 is disposed in the coupling head in the manner shown in Fig. 1, for a purpose to be described.

At the front end, the stem 26 is provided with an extended portion 33, on which a roller 34 is mounted by means of a pin 35. The roller 34 is disposed along the longitudinal center line of the stem and it is adapted to be engaged by the hook-shaped end 36 of an arm 37 extending from the lever 14.

When the coupling head is coupled to a counterpart coupling, the spring 23 will force the cam surface 16 of the lever 14 tightly into engagement with the surface 17 of the counterpart coupling and the end 36 of the arm 37 will be disengaged from the roller 34. However, when the cars are uncoupled and the couplings separate, the spring 30 will force the coupling head outwardly on the stem 26, thereby bringing the cam surface 38 on the end 36 of the arm 37 into contact with the roller 34.

The extremity of the end 36 is formed with an arcuate recess 39 into which the roller 34 rests when the coupling head 11 is moved outwardly with respect to the stem when the coupling is being uncoupled. Therefore, the lever 14 will be retained in its innermost position by the interlocking of the end of the arm 37 with the extremity of the stem 26.

As shown in Fig. 1, the coupling head 11 is formed with a lug 40 for limiting the outward swinging movement of the lever 14.

The coupling head 11 is formed with a conduit 41, the forward end of which is provided with a gasket 42 adapted to engage the corresponding gasket on the counterpart coupling and make a fluid tight joint when the couplings are connected together, while the rear end of the conduit is connected to a brake pipe 51 in the usual manner.

The forward portion of the conduit is enclosed by a tubular casing 43 containing an expansible coil spring 44. One end of the spring 44 bears against a collar 45 carried by the casing 43, while the other end of the spring bears against a sleeve 46 encircling the conduit.

The sleeve 46 carries a plurality of pins 47 which project inwardly therefrom. The extremity of each pin is disposed within a slot 48 formed on the exterior of the conduit.

The pressure exerted by the spring 44 against the sleeve 46 normally retains the pins 47 in engagement with a stop or shoulder 49 formed on the exterior of the conduit 41. In this way the abutting gaskets 42 of the two coupling heads will be held tightly together irrespective of the relative movements of the coupling heads when the cars are coupled together, as will be understood.

Mounted in the coupling head is a primary valve device 50 adapted to be automatically actuated when the cars are being uncoupled to close the communication through the conduit 41, so as to prevent the loss of fluid in the brake pipe 51 through the open end of the conduit.

The valve device 50 includes a diaphragm 52 which is mounted in the valve casing for movement toward and away from a seat rib 57 formed in the conduit 41.

On one side the diaphragm 52 is subject to the pressure of fluid in a chamber 53 formed as an enlargement of the conduit 41, while on the opposite side the diaphragm is subject to the pressure of fluid in a chamber 54.

The chamber 53 is in communication with the chamber 54 through a passage 55 having a restricted portion 56 therein to provide a choke.

As shown in Fig. 1, when the coupling is operatively connected to a counterpart coupling, the diaphragm 52 will be unseated from the seat rib 57 and will be seated against a seat rib 58 so as to cut off communication from the chamber 54 to a chamber 59 of less area. The portion of the diaphragm disposed within the seat rib 58 carries a head 60.

The fluted stem 61 of a valve 62 extends through an opening 63 in a wall 64 separating the chamber 59 from a chamber 65 and bears against the head 60. A seat 66 is formed in the wall 64 for the valve 62. The chamber 65 is open to the atmosphere through a vent 67.

Mounted in chamber 65 is an expansible coil spring 68 which bears against the head of valve 62 and maintains the stem 61 in contact with the head 60.

Mounted in chamber 59 and encircling the valve stem 61, is an expansible coil spring 69 which bears against the head 60 and tends to force the diaphragm 52 away from the seat rib 58 against the pressure of fluid in chamber 53.

However, inasmuch as chamber 59 will be open to the atmosphere through opening 63, chamber 65 and opening 67 when the couplings are connected, the portion of the diaphragm 52 outside of the seat rib 58 will be balanced, due to the free communication through passage 55 to both sides thereof, but since the area of the diaphragm inside of seat rib 58 is exposed to atmospheric pressure, the fluid under pressure in chamber 53 will maintain the diaphragm against seat rib 58.

For the purpose of controlling the operation of the valve device 50, a controlling device 70 is provided.

The controlling device 70 includes a valve 71 contained in a chamber 72, which chamber is connected to the chamber 59 by a conduit 73.

The valve 71 has a fluted stem 74 which extends through an opening 75 formed in the valve casing. The end of the stem 74 abuts a face 76 on the counterpart coupling, and in this way the valve 71 remains unseated when the couplings are coupled so that the chamber 59 will be vented to the atmosphere through conduit 73, chamber 72 and opening 75.

An expansible coil spring 77 is mounted in the chamber 72 and bears against the head of the valve 71. This spring forces the valve to its seat when the coupling is being uncoupled from a counterpart coupling.

In addition to the primary valve device 50, the apparatus is provided with a secondary valve device which is mounted in the brake pipe 51 for the purpose of controlling communication therethrough.

The secondary valve device comprises an angle cock having a plug valve 81 which is mounted in a chamber 80 formed in the brake pipe 51.

The valve 81 has a port or waterway 82 formed therein, and communicating with this port are oppositely disposed passages 83 and 84, respectively terminating at the periphery of the plug valve in cavities 85 and 86.

The plug valve 81 has a handle or arm 87 which is adapted to be actuated by the rod 88 of a piston 89 mounted in a cylinder 90. The piston rod 88 is guided by a boss 91 formed in the end of the cylinder 90, said boss having a seat rib 92 against which a valve 93 on the piston 89 abuts, when the piston is at one end of its stroke.

The piston 89 is forced away from the seat rib 92 by the pressure exerted by a coil spring 94, which encircles the boss 91, one end of the spring bearing against the piston, and the opposite end of the spring bearing against the end wall of the cylinder 90.

A chamber 95, on the side of the piston 89 opposite to the spring 94, is connected to the train signal pipe 96 by a conduit 97. Mounted in the conduit 97 is a suitable manually operated valve 98 adapted to vent the conduit to the atmosphere, for a purpose to be hereinafter described.

In operation, when the cars of a train having charged train pipes are to be separated, the trainman first actuates the valve 98 to vent the conduit 97 to the atmosphere, and then uncouples the cars in the usual manner.

When the uncoupled cars separate, the train pipe couplings will remain coupled and locked together until the cars have moved apart a distance sufficient to pull the coupling heads 11 outwardly of the stems 26 until further longitudinal movement is prevented by the pins 29 engaging the ends of the slots 28.

This action will move the end 36 of the arm 37 toward the extremity of the portion 33 of the stem. When the cam surface 38 engages the roller 34, the arm 37 will be caused to move laterally of the stem until the roller 34 engages in the recess 39. This action retracts the cam surface 16 of the lever 14 from the face 17, thereby unlatching the interlocked coupling heads.

When the coupling heads separate, the face 76 of the counterpart coupling will be withdrawn from the end of the valve stem 74. Therefore, valve 71 will be seated by the pressure exerted by spring 77, and the atmospheric vent from chamber 59 through conduit 73 will be closed.

When the valve 98 is actuated to vent conduit 97 to the atmosphere, the pressure of the fluid in chamber 95 and the signal pipe 96 will gradually reduce, and when the pressure of the fluid in chamber 95 has reduced a predetermined amount, spring 94 will force the piston 89 outwardly, thereby withdrawing rod 88 from the arm 87 of the plug valve 81.

The plug valve 81 can now be turned to position the port 82 at right angles to the position shown in Fig. 1, thereby closing the large opening through the brake pipe 51. However, on account of the manner of constructing the plug valve, a reduced amount of fluid will flow through the passage 84, port 82 and passage 83, from one side of the plug valve to the other.

After the plug valve 81 has been turned to its closed position, the reduced pressure of the fluid in chamber 53 will permit the spring 69 to force the diaphragm 52 from the seat rib 58 and seat the same against the seat rib 57, thereby cutting off communication through the conduit 41.

When the diaphragm 52 is shifted from seat rib 58 to seat rib 57, as has been just described, the head 60 will have been withdrawn from the end of the stem 61, and hence the pressure of the spring 68 will force the valve 62 to its seat, thereby closing the vent to the atmosphere from chamber 59. The pressure of the fluid in the brake pipe 51, passing into chamber 54 through passage 55 will therefore be retained in this chamber, and no further loss of the pressure of the brake pipe fluid in the charged section will occur as long as the coupling remains uncoupled, as will be readily understood.

On the other hand, in coupling an uncharged section to a charged section, when the cars are brought together for coupling up the trainman first turns the valve 98 to close the conduit 97 from the atmosphere. The impact of the two coupling heads coming together will move the coupling head 11 rearwardly on the stem 26 and this action will detach the roller 34 from its engagement with the recess 39 of the arm 36.

When the projecting nose 12 of one train pipe coupling enters the recess 13 of the counterpart coupling, the gaskets 42 of the abutting ends of the conduits 41 will meet and the conduits 41 will be connected together. The pressure of spring 23 will force the lever 14 outwardly toward the nose 12 of the counterpart coupling head so that the cam face 16 engages the face 17 and locks the two coupling heads tightly together in the manner shown in Fig. 1.

When the coupling heads 11 come together for coupling up, the stem 74 of the valve 71 will engage the face 76 of the counterpart coupling head and the valve 71 will thus be unseated. Hence the fluid in chamber 59 will be vented to the atmosphere through conduit 73, chamber 72 and opening 75.

When the pressure of the fluid in chambers 54 and 59 is reduced by the escape of the fluid through opening 75, the fluid in chamber 53 will force the diaphragm 52 away from the seat rib 57 and when the pressure builds up in chamber 53 the diaphragm will be forced against the seat rib 58. This action can be timed to take place immediately after the gaskets 42 have been brought together, so that brake pipe pressure can be quickly established in the connected train pipe sections.

After the train pipe coupling heads 11 have been coupled, the pressure of the fluid in the signal pipe 96 is built up, in the customary manner. When this signal pipe pressure builds up in chamber 95, the piston 89 will be forced outwardly against the pressure of spring 94. This action will move the tip of the rod 88 into engagement with the arm 87 and consequently the continued outward movement of the piston will rotate the plug valve 81 to bring the port 82 into registration with the opening in the train pipe 51. In this way unrestricted flow of the fluid in the brake pipe can be had after the couplings have been coupled together and a predetermined amount of pressure has first been built up in the uncharged section.

In devices of the type herein shown and described it is of advantage to permit a predetermined reduction in brake pipe pressure when the couplings are unintentionally parted before cutting off communication through the conduits 41, so that an emergency application of the brakes can be effected.

Therefore, when the train pipe coupling heads are unintentionally parted and the face 76 recedes from the projecting ends of the valve stems 74, the spring 77 will force the valve 71 of each coupling head to its seat. In this way the atmospheric vent from chamber 59 through conduit 73, chamber 72, and opening 75 will be closed. However, inasmuch as chamber 59 is also vented to the atmosphere through opening 63, chamber 65 and vent 67 should any fluid in chamber 54 leak past the seat rib 58, such fluid can pass to the asmosphere through vent 67.

In this manner a quantity of fluid will be permitted to flow from the brake pipe 51, through chamber 53 and out the conduit 41 of the separated couplings to produce an emergency application of the brakes. As this action will reduce the pressure of the fluid in chamber 53, the diaphragm 52 will be forced from the seat rib 58 by spring 69 and will be seated against seat rib 57, thereby closing the passage 41 so as to retain the fluid in the brake pipe after the emergency application of the brakes has been effected.

For the purpose of providing means for indicating when the plug valve of the train pipe coupling is closed, the brake pipe 51 may be equipped with a valve of the type shown in Fig. 2, in lieu of the secondary valve device shown in Fig. 1.

As shown, the wall of the chamber 80 is provided with an atmospheric passage 101 that is adapted to be connected with a cavity 102 formed in the plug valve 103 when the plug valve is in closed position.

The cavity 102 has a greater area than the cavity 86 of the plug valve 81, and this cavity 102 is connected to the main port or waterway 104 of the plug valve by means of a passage 105. On the opposite side of the port 103, the plug valve is formed with a passage 106 and a cavity 107 which are respectively similar in construction to the passage 83 and cavity 85 heretofore referred to.

When making up a train in which the train pipe couplings are equipped with the plug valves 103, should a cock handle be left in closed position, brake pipe air escapes through passage 105, cavity 102 and passage 101 to the atmosphere, thereby warning the trainman.

On the rear of an empty section which is being attached to a charged section, the diaphragm 52 will be seated against the seat rib 57 due to the pressure of the spring 69. The plug valve on the rear is so positioned as to restrict the amount of fluid so as to prevent the diaphragm 52 from being lifted from the seat rib 57 and permit the pressure to build up above it. As soon as the pressure on both sides of the diaphragm equalizes, the plug valve handle is moved to open position, thereby moving the cavity 102 from registration with the passage 101 to stop the blow to atmosphere at the cock.

While one illustrative embodiment of the invention has been described in detail, it is not my intention to limit its scope to that embodiment or otherwise than by the terms of the appended claims.

Having now described my invention, what I claim as new and desire to secure by Letters Patent, is:—

1. The combination with a brake pipe and a signal pipe, of an automatic train pipe coupling having a conduit communicating with the brake pipe, valve means for establishing communication through the conduit, or for cutting off communication therethrough when the coupling is being coupled to or uncoupled from a counterpart coupling, a secondary valve means for regulating the quantity of fluid flowing through the brake pipe irrespective of the position of the first-named valve means, and means actuated by the pressure of the fluid in the signal pipe for actuating the secondary valve means.

2. The combination with a brake pipe, of a coupling having a conduit communicating with the brake pipe, a valve controlling communication through the brake pipe, a port in the valve for permitting an unrestricted flow of fluid through the pipe when the valve is fully opened, and passages communicating with said port for permitting a limited amount of fluid to flow through the brake pipe when the valve is closed.

3. An automatic train pipe coupling having a conduit communicating with the brake pipe, primary valve means controlling communication through the conduit, secondary valve means for controlling communication through the brake pipe to permit a restricted flow of fluid from the brake pipe to the conduit, means for automatically actuating the primary valve means to open or close the conduit when the coupling is coupled to or uncoupled from a counterpart coupling, and means for actuating the second valve means to unrestrictedly open the brake pipe, including a pressure sensitive device operable only upon the coming together of the coupling with a counterpart coupling.

4. A device of the class described comprising a coupling head having a conduit, a valve device for controlling communication through the conduit, said valve device including a diaphragm movable toward and away from a seat formed in the conduit, a brake pipe communicating with the conduit, and means for controlling the amount of fluid passing from the brake pipe to the conduit whereby sufficient fluid pressure wil be maintained in the conduit to force the diaphragm against its seat when the coupling is uncoupled.

5. A device of the class described comprising a coupling head having a conduit, a chamber connected to the conduit, opposed valve seats, one of which is positioned between the conduit and the chamber, a valve mounted in the chamber and adapted to alternately engage said seats to either establish communication or to cut off communication through the conduit, a brake pipe communicating with the conduit, and means for controlling the amount of fluid passing through the brake pipe whereby sufficient pressure will be maintained in the chamber to actuate the conduit valve.

6. A device of the class described comprising a coupling having a conduit, a plurality of chambers connected to the conduit, opposed valve seats, one of which is disposed between the conduit and one of said chambers, a diaphragm interposed between the chambers and adapted to engage said seats to either establish communication or to cut off communication through the conduit, a brake pipe communicating with the chambers, and a valve for controlling the amount of fluid passing from the brake pipe to the chambers whereby sufficient pressure will be maintained at all times to force the diaphragm toward either of its seats.

7. The combination with a brake pipe, of a coupling having a conduit communicating with the brake pipe and, a valve controlling communication from the brake pipe to said conduit, said valve having a through port which in open position provides a free flow of fluid and an auxiliary port for restricting the flow of fluid when the through port is in closed position.

8. The combination with a brake pipe, of a coupling having a conduit communicating with the brake pipe, and a valve controlling communication from the brake pipe to said conduit, said valve having a through port which in open position provides a free flow of fluid, and auxiliary ports connected to said through port for providing a restricted flow of fluid when the through port is in closed position.

9. The combination with a brake pipe, of a coupling having a conduit communicating with the brake pipe, and a valve for controlling communication from the brake to the conduit, said valve having a port for permitting an unrestricted flow of fluid when the valve is open, supplemental ports of smaller flow area for permitting a restricted amount of fluid to flow through the valve when the same is closed, and a port adapted to register with said supplemental ports for venting a portion of the fluid flowing through the closed valve to the atmosphere.

In testimony whereof I have hereunto set my hand, this 8th day of December, 1928.

UNCAS A. WHITAKER.